US012776523B2

(12) United States Patent
Ichikawa

(10) Patent No.: US 12,776,523 B2
(45) Date of Patent: Oct. 27, 2026

(54) CONTROL DEVICE AND VEHICLE

(71) Applicant: TOYOTA JIDOSHA KABUSHIKI KAISHA, Toyota (JP)

(72) Inventor: Shinji Ichikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/794,286

(22) Filed: Aug. 5, 2024

(65) Prior Publication Data

US 2025/0192241 A1 Jun. 12, 2025

(30) Foreign Application Priority Data

Dec. 6, 2023 (JP) ................................ 2023-206037

(51) Int. Cl.
*H01M 10/42* (2006.01)
*G07C 5/08* (2006.01)
*H01M 10/48* (2006.01)

(52) U.S. Cl.
CPC ...... *H01M 10/4228* (2013.01); *G07C 5/0808* (2013.01); *H01M 10/482* (2013.01); *H01M 2220/20* (2013.01)

(58) Field of Classification Search
CPC ........... H01M 10/4228; H01M 10/482; H01M 2220/20; H01M 50/249; G07C 5/0808; Y02E 60/10; B60L 3/0046; B60L 3/0069; B60L 53/80
See application file for complete search history.

(56) References Cited

U.S. PATENT DOCUMENTS 5,760,587 A * 6/1998 Harvey ................ G01R 31/007 324/426
2003/0141842 A1* 7/2003 Izawa ................ H01M 50/503 320/116
2003/0209375 A1* 11/2003 Suzuki .................... B60L 58/25 180/68.5
2005/0099160 A1 5/2005 Asaumi et al.
2006/0006840 A1* 1/2006 Furukawa ............ B60L 3/0069 320/116
2011/0313613 A1* 12/2011 Kawahara .............. B60L 50/61 320/134
2015/0168497 A1* 6/2015 Tabatowski-Bush ..... B60L 3/04 324/426
2016/0272083 A1* 9/2016 Dai .................... B60H 1/00392
(Continued)

FOREIGN PATENT DOCUMENTS

JP 2005-145097 A 6/2005
JP 2023-033812 A 3/2023
(Continued)

*Primary Examiner* — Jelani A Smith
*Assistant Examiner* — Alyssa Rorie
(74) *Attorney, Agent, or Firm* — SoraIP, Inc.

(57) ABSTRACT

An ECU (control device) includes a processor and a communication unit that communicates with each of the plurality of battery packs (batteries). Each of the plurality of battery packs is configured to execute an electrical leakage detection process and is replaceable. The processor selects one battery to execute the electrical leakage detection process from the battery packs, based on information on the communication start timings of the battery packs acquired through the communication unit.

7 Claims, 7 Drawing Sheets

(56) References Cited

U.S. PATENT DOCUMENTS

| | | | |
|---|---|---|---|
| 2021/0188116 A1 | 6/2021 | Kikuchi et al. |
| 2023/0063219 A1 | 3/2023 | Moriya et al. |
| 2023/0095740 A1 | 3/2023 | Kuranuki et al. |
| 2023/0168315 A1 | 6/2023 | Furukawa et al. |

FOREIGN PATENT DOCUMENTS

| | | |
|---|---|---|
| JP | 2023-081523 A | 6/2023 |
| JP | 2023-101504 A | 7/2023 |
| WO | 2021/200196 A1 | 10/2021 |

* cited by examiner

CONTROL DEVICE AND VEHICLE

CROSS-REFERENCE TO RELATED APPLICATION

This application claims priority to Japanese Patent Application No. 2023-206037 filed on Dec. 6, 2023, incorporated herein by reference in its entirety.

BACKGROUND

1. Technical Field

The present disclosure relates to control devices and vehicles.

2. Description of Related Art

Japanese Unexamined Patent Application Publication No. 2023-101504 (JP 2023-101504 A) discloses a vehicle equipped with a replaceable battery pack.

SUMMARY

Although not specified in JP 2023-101504 A, there are cases where a plurality of battery packs that can execute an electrical leakage detection process and that is replaceable is mounted on a vehicle. In this case, the electrical leakage detection functions of the battery packs may interfere with each other due to the electrical leakage detection functions of the battery packs being activated at the same timing etc. In this case, it is difficult to correctly detect an electrical leakage.

The present disclosure was made to solve the above issue, and an object of the present disclosure is to provide a control device and a vehicle that can reduce abnormal execution of an electrical leakage detection process by a plurality of replaceable batteries.

A control device according to a first aspect of the present disclosure is a control device for a vehicle equipped with a plurality of batteries. The control device includes:

a processor; and a communication unit configured to communicate with each of the batteries.

Each of the batteries is configured to execute an electrical leakage detection process and is replaceable.

The processor is configured to select part of the batteries to execute the electrical leakage detection process, based on information on the batteries acquired via the communication unit.

In the control device according to the first aspect of the present disclosure, as described above, part of the batteries to execute the electrical leakage detection process is selected. This can reduce the degree of interference between the batteries compared to the case where the electrical leakage detection functions of all the batteries interfere with each other. As a result, abnormal execution of the electrical leakage detection process can be reduced in the vehicle including the batteries that are configured to execute the electrical leakage detection process and that are replaceable.

In the control device according to the first aspect, the processor may be configured to select one battery to execute the electrical leakage detection process from the batteries.

With this configuration, one battery is caused to execute the electrical leakage detection process. This can further reduce interference between the electrical leakage detection functions of the batteries.

In this case, the processor may be configured to select a battery that first starts communicating with the communication unit from the batteries as the battery to execute the electrical leakage detection process.

With this configuration, the battery to execute the electrical leakage detection process can be easily selected based on the timing at which the communication is started.

In the control device according to the first aspect, the processor may be configured to select a battery disposed at a predetermined position in the vehicle from the batteries as the battery to execute the electrical leakage detection process.

With this configuration, the battery to execute the electrical leakage detection process can be easily selected based on the position where the battery is mounted.

A vehicle according to a second aspect of the present disclosure includes:

a plurality of batteries; and the control device according to the first aspect.

It is thus possible to provide a vehicle that can reduce abnormal execution of an electrical leakage detection process.

The present disclosure can reduce abnormal execution of an electrical leakage detection process by a plurality of replaceable batteries.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
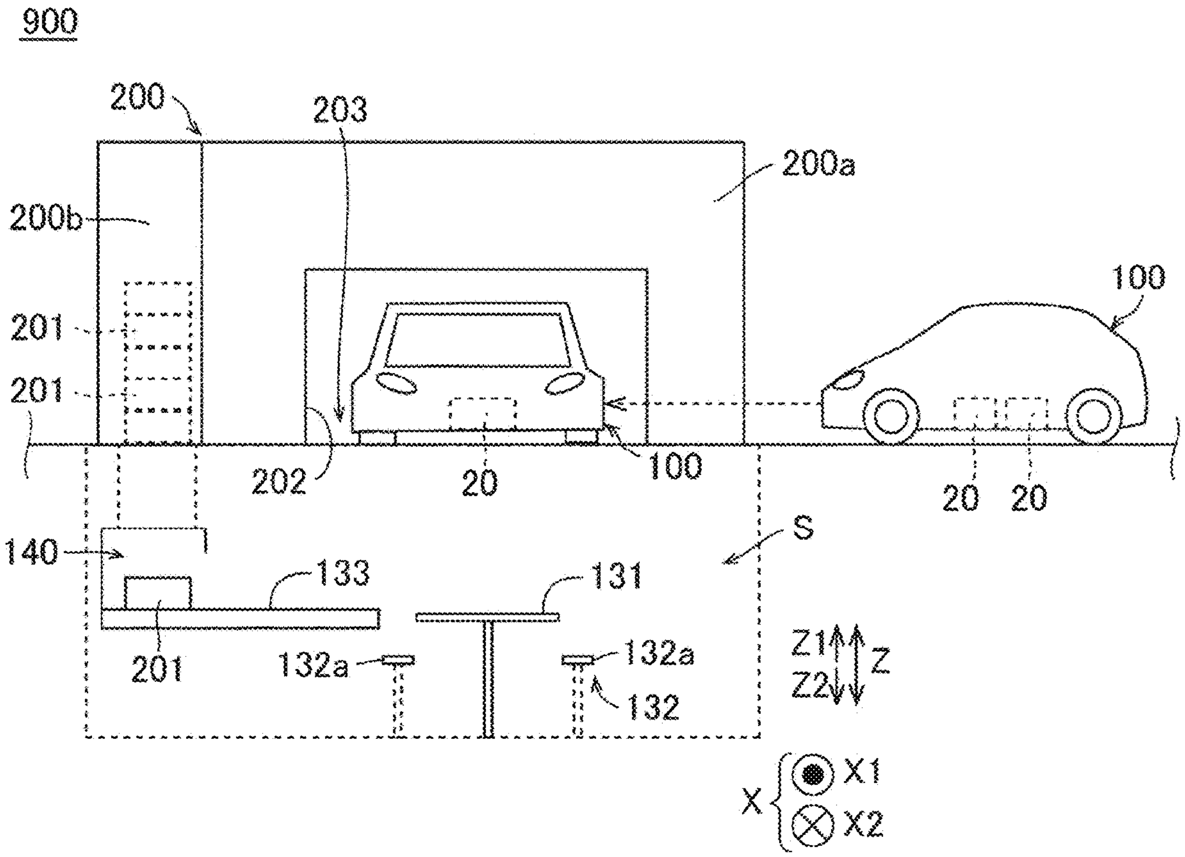
FIG. 1 is a diagram illustrating a configuration of a battery swapping system according to a first embodiment.

Hereinafter, an embodiment of the present disclosure will be described in detail with reference to the drawings. The same or corresponding parts in the drawings are designated by the same reference signs and repetitive description will be omitted.

First Embodiment

Configuration of Battery Swapping System

FIG. 1 is a diagram illustrating a battery swapping system 900 including an electrified vehicle 100 and a battery swapping apparatus 200 according to a first embodiment. Note that electrified vehicle 100 is an exemplary "vehicle" of the present disclosure.

Electrified vehicle 100 includes a plurality (two in the first embodiment) of battery packs 20. The battery pack 20 stores electric power used for driving electrified vehicle 100. The two battery packs 20 are arranged side by side in the front-rear direction of electrified vehicle 100, for example. The battery pack 20 is an example of a "battery" of the present disclosure.

Electrified vehicle 100 is, for example, a plug-in hybrid electric vehicle (PHEV), a battery electric vehicle (BEV), or a fuel cell electric vehicle (FCEV).

The battery swapping apparatus 200 includes a battery swapping apparatus body 200*a* in which battery swapping is performed, and a storage 200*b* in which the batteries 201 are stored. The battery swapping apparatus body 200*a* is an apparatus that perform battery swapping for replacing the battery pack 20 on electrified vehicle 100 with a battery 201. The storage 200*b* is located next to the battery swapping apparatus body 200*a*. The battery swapping apparatus 200 (battery swapping apparatus body 200*a*) is provided with an entrance and exit 202 for an electrified vehicle 100 to enter and exit.

The batteries 201 stored in the storage 200*b* are moved to the temporary storage space 140 provided in the underfloor area S, and then transported to electrified vehicle 100. In the underfloor area S, a battery mounting table 131, an elevating unit 132, and a conveyance unit 133, which will be described later, are provided.

The battery swapping apparatus 200 is provided with a vehicle stop area 203. The battery swapping apparatus 200 performs battery swapping with electrified vehicle 100 stopped in the vehicle stop area 203. For example, in a navigation system (not shown) of electrified vehicle 100, an operation for instructing the user to start battery swapping work is performed by the user. In response to this, an instruction signal for starting the battery swapping work is sent from electrified vehicle 100 to the battery swapping apparatus 200. The battery swapping apparatus 200 starts control of the battery swapping work in response to the reception of the instruction signal.

The elevating unit 132 raises and lowers electrified vehicle 100 while holding electrified vehicle 100 from below. The elevating unit 132 includes a pair of lifting bars 132*a*. Electrified vehicle 100 is supported from below by a pair of lifting bars 132*a*. Battery swapping (battery removal and installation) is performed with electrified vehicle 100 held horizontally by a pair of lifting bars 132*a*.

The battery mounting table 131 is configured to be movable up and down in the Z direction. When the battery mounting table 131 is raised to the height position of the bottom of electrified vehicle 100, the battery pack 20 removed from electrified vehicle 100 is placed on the battery mounting table 131. Further, the battery mounting table 131 on which the battery 201 is placed is raised to the height position of the bottom of electrified vehicle 100, whereby the battery 201 is attached to electrified vehicle 100.

The battery mounting table 131 raises and lowers the battery packs 20 one by one. The battery mounting table 131 is movable in the X-direction to a position corresponding to each of the two battery arrangement positions in electrified vehicle 100. As a result, the two battery packs 20 are sequentially replaced (removed and installed).

The conveyance unit 133 is configured to be able to convey the batteries (201, 20). Specifically, the conveyance unit 133 conveys the battery pack 20 removed from electrified vehicle 100 and placed on the battery mounting table 131 to the temporary storage space 140. Further, the conveyance unit 133 conveys the battery 201 conveyed from the storage 200*b* to the temporary storage space 140 to the battery mounting table 131.

Figure 2:
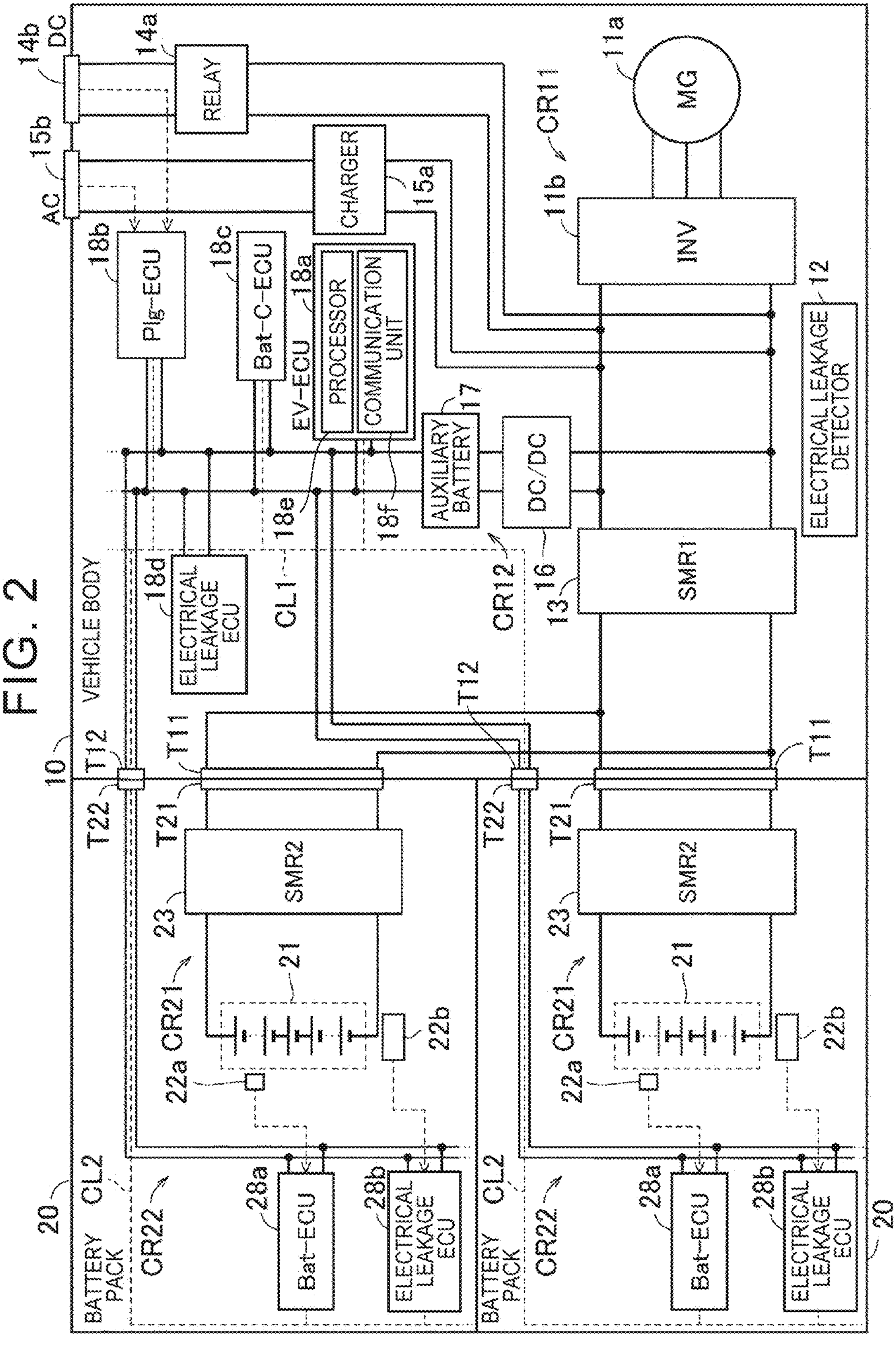
FIG. 2 is a diagram illustrating a configuration of an electrified vehicle according to the first embodiment.

FIG. 2 is a diagram illustrating a configuration of an electrified vehicle 100 according to the first embodiment. Referring to FIG. 2, electrified vehicle 100 includes a vehicle body 10 in addition to the two battery packs 20. The vehicle body 10 is a part of electrified vehicle 100 other than the battery pack 20.

The vehicle body 10 includes a circuit CR11 and a circuit CR12. The battery pack 20 includes a circuit CR21 and a circuit CR22. The circuit CR21 corresponds to a first high-voltage circuit configured to apply a voltage (high voltage) generated by the battery cell 21 to the circuit CR11. The circuit CR11 corresponds to a second high-voltage circuit to which a voltage (high voltage) is applied from the battery cell 21. The circuit CR12 corresponds to a first low-voltage circuit configured to apply a voltage (low voltage) generated by the auxiliary battery 17 to the circuit CR22. The circuit CR22 corresponds to a second low-voltage circuit that receives a voltage (low voltage) from the auxiliary battery 17. A DC/DC converter 16 is provided between the circuit CR11 and the circuit CR12.

The circuit CR11 in the vehicle body 10 includes a motor generator (MG) 11*a*, an inverter 11*b*, an electrical leakage detector 12, a DC charge relay 14*a*, a DC inlet 14*b*, an AC charger 15*a*, and an AC inlet 15*b*.

The circuit CR21 in the battery pack 20 is provided with a battery management system (BMS) 22*a* and an electrical leakage detector 22*b*.

The vehicle body 10 further includes two terminals T11 to which the battery pack 20 is detachable, and an SMR 13 disposed between the terminals T11 and the circuit CR11. The circuit CR11 (high-voltage power supply line) is connected to the respective terminals T11 via the SMR 13.

The battery pack 20 further includes a terminal T21 to which the vehicle body 10 is detachable, and the SMR 23 disposed between the terminal T21 and the circuit CR21. The circuit CR21 (high-voltage power supply line) is connected to the terminal T21 via the SMR 23. Note that "SMR" means a system main relay.

The battery cell 21 is constituted by a secondary battery such as a lithium ion battery, a nickel metal hydride battery, or a sodium ion battery. The type of the secondary battery may be a liquid secondary battery or an all-solid secondary battery. A plurality of secondary batteries may form a battery pack.

The vehicle body 10 further includes two terminals T12. Circuit CR12 (low-voltage power supply lines) in the vehicle body 10 are connected to the respective terminals T12. The communication-line CL1 in the vehicle body 10 is also connected to the respective terminals T12. The battery pack 20 further includes a terminal T22. The circuit CR22 (low-voltage power supply line) in the battery pack 20 is connected to the terminal T22. The communication line CL2 in the battery pack 20 is also connected to the terminal T22.

The auxiliary battery 17 is an in-vehicle battery that supplies electric power for driving auxiliary machines mounted on the vehicle 100. The auxiliary battery 17 outputs DC power to the circuit CR12 (low-voltage power supply line). The circuit CR12 further includes ECUs 18*a*, 18*b*, 18*c*, and 18*d* in addition to the auxiliary battery 17. The circuit CR22 further includes ECUs 28*a*, 28*b*. The auxiliary battery 17 supplies electric power to each of ECUs 18*a* to 18*d*, 28*a*, 28*b* connected to the low-voltage power supply line, for example. Note that "ECU" means an electronic control unit. In addition, ECU 18*a* is an example of the "control device" of the present disclosure.

ECU 18*a* corresponds to a control device (EV-ECU) that controls various types of control related to the vehicle 100. ECU 18*a* includes a processor 18*c* and a communication unit 18*f*. The communication unit 18*f* receives information of each of the plurality of battery packs 20 through communication through the communication-line CL1. Specifically, the communication unit 18*f* receives data from each of ECU 28*a* and ECU 28*b*.

ECU 18*b* corresponds to a control device (Plg-ECU) that detects the status of each of DC inlet 14*b* and AC inlet 15*b*. ECU 18*c* corresponds to a control device (Bat-C-ECU) that controls DC charge-relay 14*a* and AC charger 15*a*. ECU 18*d* corresponds to a control device that monitors an electrical leakage condition of the circuit CR11.

ECU 28*a* corresponds to a control device (Bat-ECU) that monitors the status of the battery cell 21 and controls SMR 23. ECU 28*b* corresponds to a control device that monitors an electrical leakage condition of the circuit CR21. ECU are communicably connected to each other via an in-vehicle network (e.g., a controller area network (CAN)).

The electrical leakage detector 12 detects an electrical leakage state related to the circuit CR11, and outputs the detected electrical leakage state to ECU 18*d*. BMS 22*a* detects the condition (current, voltage, temperature, etc.) of the battery cell 21, and outputs the detected condition to ECU 28*a*. The electrical leakage detector 22*b* detects an electrical leakage state related to the circuit CR21, and outputs the detected electrical leakage state to ECU 28*b*. When the circuit CR11 and the circuit CR21 are connected to each other, the electrical leakage detector 12 or 22*b* detects the electrical leakage state of the circuit formed by the circuit CR11 and CR21. ECU 18*a* acquires information indicating a battery state and an electrical leakage state from ECUs 18*d*, 28*a*, 28*b*. Note that the electrical leakage detection process is always executed when electrified vehicle 100 is driven (traveling, charging, or the like).

Each of SMR 13 and SMR 23 switches the connection/disconnection of the electrical path between the circuit CR11 and the circuit CR21. ECU 18*a* brings both SMR 13 and SMR 23 into a closed state (connected state) when the voltage of the battery cell 21 is applied to the circuit CR11. When the voltage of the battery cell 21 is not applied to the circuit CR11, ECU 18*a* sets at least one of SMR 13 and SMR 23 to the open state (cut-off state). When electrified vehicle 100 is driven (traveling, charging, or the like), SMR 13 and the two SMRs 23 are closed.

The terminal T21 and the terminal T22 of the battery pack 20 are configured to be attachable to and detachable from the terminal T11 and the terminal T12 of the vehicle body 10, respectively. When the terminals T21 and T22 are connected to the terminals T11 and T12, respectively, the battery pack 20 is attached to the vehicle body 10.

MG 11*a* functions as a motor for driving electrified vehicle 100. The inverter 11*b* functions as a power control unit (PCU) for MG 11*a*. The inverter 11*b* drives MG 11*a* using the electric power supplied from the battery cell 21.

Each of DC inlet 14*b* and AC inlet 15*b* has a terminal for detecting connection/disconnection of the charging cable (charging plug), and outputs a signal indicating whether or not the charging cable is connected to ECU 18*b*. ECU 18*a* acquires information indicating the inlet state from ECU 18*b*, and sends a control command to ECU 18*c*. In the vehicle 100, charge control is executed by cooperation of ECUs 18*a* to 18*c*.

Here, in a conventional vehicle, each of the electrical leakage detection functions of the plurality of battery packs may interfere with each other due to the same timing operation or the like. the electrical leakage detection means detecting an insulation resistance value when an electrical leakage is intentionally generated and determining whether or not there is an abnormality in the insulation resistance value. Therefore, the fact that the electrical leakage detection functions interfere with each other means that the insulation resistance value is detected abnormally due to the intentional occurrence of the electrical leakage in the plurality of battery packs. In this case, it is difficult to normally detect an electrical leakage.

Therefore, in the first embodiment, ECU 18*a* (processor 18*e*) selects the battery pack 20 to execute the electrical leakage detection process from the plurality of battery packs 20. Specifically, ECU 18*a* determines one battery pack 20 to execute the electrical leakage detection process and one battery pack 20 not to execute the electrical leakage detection process. Thus, since the electrical leakage detection process is executed only in one battery pack 20 of the plurality of battery packs 20, it is possible to reduce interference between the electrical leakage detection functions.

Even if an electrical leakage occurs in the battery pack 20 not to execute the electrical leakage detection process, the presence or absence of an electrical leakage can be detected by the electrical leakage detector 12 (18*d*) of the vehicle. Based on this information and the electrical leakage detection result from the battery pack 20 to execute the electrical leakage detection process, it is possible to identify the battery pack 20 in which the electrical leakage has occurred.

Sequencing ECU

Figure 3:
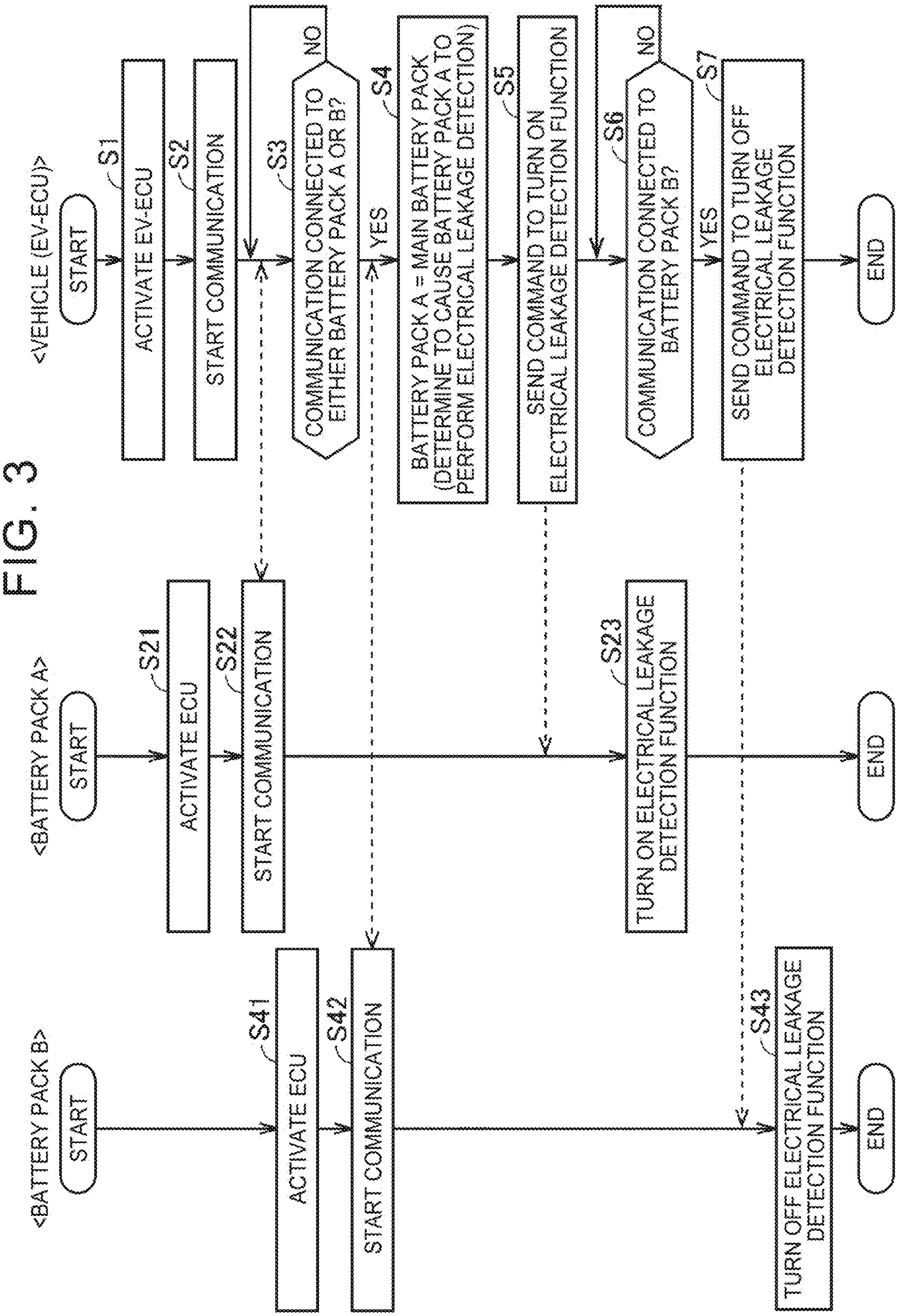
FIG. 3 is a sequence diagram illustrating control between ECU in electrified vehicle according to the first embodiment.

Next, referring to FIG. 3, a process of selecting the battery pack 20 to execute the electrical leakage detection process according to ECU 18*a* (electrified vehicle 100) will be described. Note that the two battery packs 20 are removed from electrified vehicle 100 prior to the sequencing of FIG. 3. For convenience of explanation, the two battery packs 20 are referred to as a battery pack A and a battery pack B, respectively.

In S1, ECU 18*a* (EV-ECU) is activated. At this time, power is supplied to ECU 18*a* from the auxiliary battery 17.

In S2, ECU 18*a* (communication unit 18*f*) starts communication. Specifically, ECU 18*a* (communication unit 18*f*) starts communication with another ECU (18*b*, 18*c*, 18*d* or the like) in electrified vehicle 100.

In S3, ECU 18*a* (processor 18*e*) determines whether communication is connected to one of the battery packs A and B. When communication is connected to one of the battery packs A and B (Yes in S3), the process proceeds to S4. When the communication is not yet connected to either of the battery packs A and B (No in S3), S3 process is repeated.

It is assumed that ECUs (28*a* and 28*b*) of the battery pack A are started before ECU of the battery pack B in S21 because the battery pack A is attached to electrified vehicle 100 before the battery pack B.

In S22, ECUs (28*a* and 28*b*) of the battery pack A initiate communication. This allows ECUs (28*a* and 28*b*) of the battery pack A to communicate with ECU 18*a* of electrified vehicle 100. That is, ECU 18*a* is communicated with ECUs (28*a* and 28*b*) of battery pack A prior to ECUs (28*a* and 28*b*) of battery pack B. Note that the information that the battery pack A is communicated with ECU 18*a* earlier than the battery pack B is an exemplary "information on a plurality of batteries" of the present disclosure.

Due to the fact that the battery pack B is attached to electrified vehicle 100 later than the battery pack A, ECUs (28*a* and 28*b*) of the battery pack B are activated later than ECU of the battery pack A in S41.

In S42, ECUs (28*a* and 28*b*) of the battery pack B initiate communication. This allows communication between ECUs (28*a* and 28*b*) of the battery pack B and ECU 18*a* of electrified vehicle 100.

When ECU communication of the battery pack A is started, ECU 18*a* process of electrified vehicle 100 shifts from S3 to S4. In S4, ECU 18*a* selects the battery pack A as the main battery pack 20. In addition, ECU 18*a* selects the battery pack B as the sub-battery pack 20. Accordingly, ECU 18*a* decides to cause the battery pack A to execute the electrical leakage detection process.

In S5, ECU 18*a* sends, through the communication unit 18*f*, a command signal for turning ON the electrical leakage detection function to ECUs (28*a* and/or 28*b*) of the battery pack A. Consequently, the command signal for turning ON the fault detection function is received by ECU 28*b*. The process then proceeds to S6.

In S23, the battery pack A (ECU 28*b*) turns on the electrical leakage detection function (executes the electrical leakage detection process). Thereafter, the process of the battery pack A is ended.

In S6, ECU 18*a* determines whether or not communication with the battery pack B (28*a*, 28*b*) is connected. When communication with the battery pack B is connected (Yes in S6), the process proceeds to S7. When communication with the battery pack B is not connected (No in S6), S6 process is repeated.

In S7, ECU 18*a* sends, through the communication unit 18*f*, a command signal for turning OFF the electrical leakage detection function to ECUs (28*a* and/or 28*b*) of the battery pack B. Consequently, the command signal for turning OFF the fault detection function is received by ECU 28*b*. Thereafter, ECU 18*a* process ends.

In S43, the battery pack B (ECU 28*b*) turns OFF the electrical leakage detection function. When the electrical leakage detection function of the battery pack B is off at the time of starting communication of the battery pack B, S7 and S43 may not be performed. Thereafter, the process of the battery pack B is ended.

As described above, in the first embodiment, the processor 18*e* selects one battery pack 20 to execute the electrical leakage detection process from the plurality of battery packs 20. As a result, it is possible to reduce simultaneous execution of the electrical leakage detection processes of the plurality of battery packs 20. As a result, it is possible to reduce interference of the plurality of electrical leakage detection processes with each other. As a result, it is possible to reduce abnormal execution of the electrical leakage detection process.

In the first embodiment, the processor 18*e* selects the battery pack 20 that first started communicating with the communication unit 18*f* as the battery pack 20 to execute the electrical leakage detection process from the plurality of battery packs 20. As a result, it is possible to start the execution of the electrical leakage detection process at a relatively early stage compared with the case where the battery pack 20 that started the communication last is caused to execute the electrical leakage detection process.

Second Embodiment

Next, a second embodiment of the present disclosure will be described with reference to FIGS. 4 and 5. In the second embodiment, the battery pack 20 to execute the electrical leakage detection process is selected based on the position where each battery pack 20 is mounted. This is different from the first embodiment in which the battery pack 20 to execute the electrical leakage detection process is selected based on the timing at which the communication of the battery pack 20 is started. Note that the same components as those in the first embodiment are denoted by the same reference numerals and will not be described repeatedly.

Figure 4:
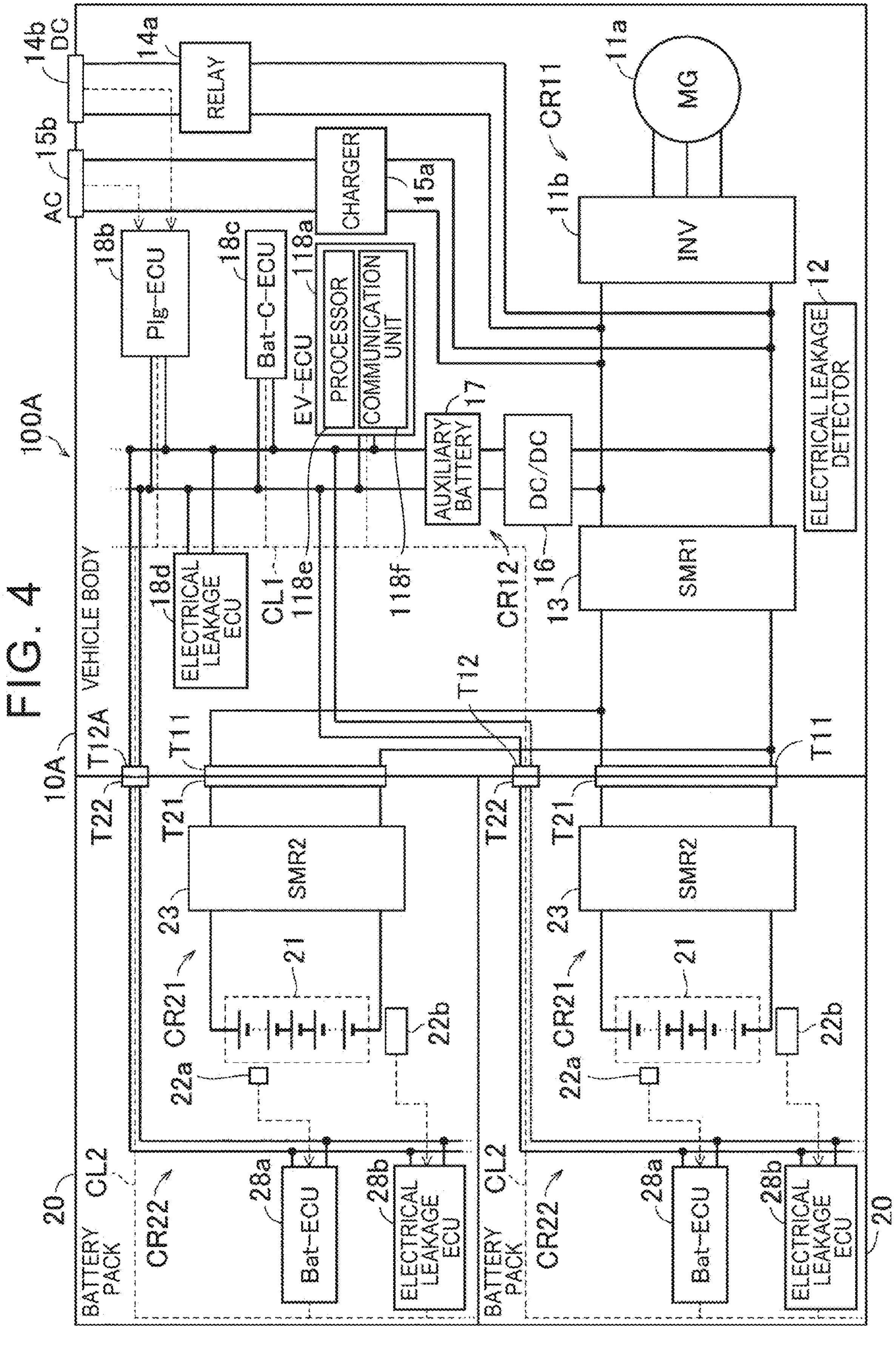
FIG. 4 is a diagram illustrating a configuration of an electrified vehicle according to a second embodiment.
Figure 5:
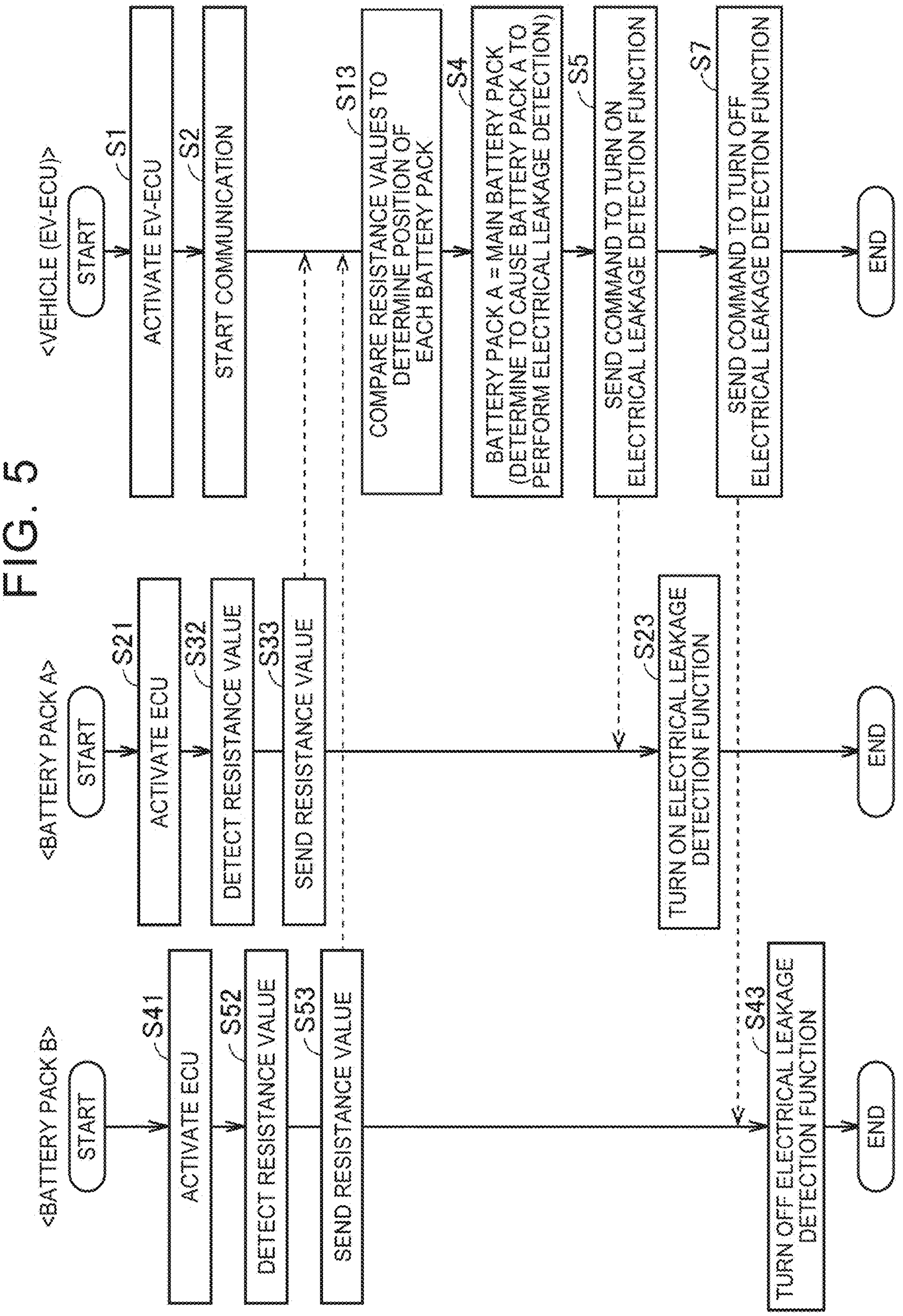
FIG. 5 is a sequence diagram illustrating control between ECU in electrified vehicle according to the second embodiment.

FIG. 4 is a diagram illustrating a vehicle body 10A of an electrified vehicle 100A and a plurality of battery packs 20. The vehicle body 10A includes a ECU 118*a* instead of ECU 18*a* of the first embodiment. ECU 118*a* includes a processor 118*e* and a communication unit 118*f*. Note that ECU 118*a* is an exemplary "control device" of the present disclosure. The processor 118*e* and the communication unit 118*f* are exemplary "processor" and "communication unit" of the present disclosure, respectively.

The vehicle body 10A includes one terminal T12 and one terminal T12A. That is, the vehicle body 10A includes a terminal T12A instead of one of the two terminals T12 provided in the vehicle body 10 in the first embodiment.

The terminals T12 and T12A differ from each other in resistivity. Specifically, the terminal T12 includes a plurality of (e.g., ten) identical pins (not shown). The terminal T12A includes a plurality of (e.g., nine) pins that are the same as the terminal T12, and pins that differ in resistivity from the pins (e.g., one pin).

Accordingly, the resistance value between the battery pack 20 connected to the terminal T12 and ECU 118*a* and the resistance value between the battery pack 20 connected to the terminal T12A and ECU 118*a* differ from each other. The resistance value is calculated by ECU 28*a*, for example, based on a detected value of a voltage sensor (not shown) or the like provided in the battery pack 20. The battery pack 20 (ECU 28*a*) sends the calculated resistance value data to ECU 118*a*. Note that the resistance value information is an example of "information on a plurality of batteries" of the present disclosure.

ECU 118*a* detects a terminal (T12 or T12A) to which each battery pack 20 is connected, based on the resistance value information sent from each battery pack 20. ECU 118*a* is configured to send a command signal to execute the electrical leakage detection process to the battery pack 20 mounted at a position corresponding to the terminal T12A.

Sequencing ECU

Next, referring to FIG. 5, a process of selecting the battery pack 20 to execute the electrical leakage detection process by ECU 118*a* will be described. Note that the plurality of battery packs 20 are removed from electrified vehicle 100A prior to the sequencing of FIG. 5. Steps in which the same processing as that of the sequence of the first embodiment (see FIG. 3) is performed are denoted by the same reference numerals as those of the first embodiment and will not be described repeatedly. In the second embodiment, it is assumed that the battery pack A is connected to the terminal T12A and the battery pack B is connected to the terminal T12.

In S32 after S21, the battery pack A (ECU 28*a*) calculates a resistance value between the battery pack A and ECU 118*a* (for example, a resistance value of a connecting part between the terminal T12A and the terminal T22).

In S33, the battery pack A (ECU 28*a*) sends the resistance value data calculated in S32 to electrified vehicle 100A (ECU 118*a*).

In S52 after S41, the battery pack B (ECU 28*a*) calculates a resistance value between the battery pack B and ECU 118*a*

(for example, a resistance value of a connecting part between the terminal T12 and the terminal T22).

In S53, the battery pack B (ECU 28*a*) sends the resistance value data calculated in S52 to electrified vehicle 100A (ECU 118*a*).

In S13, ECU 118*a* of electrified vehicle 100A compares the resistance of S32 with the resistance of S53. Thus, ECU 118*a* detects the mounting positions of the battery pack A and the battery pack B. For example, ECU 118*a* may have in advance the correct data of the resistance value corresponding to the terminal T12A and the correct data corresponding to the terminal T12, and compare the resistance values of S32 and S53 with the correct data. Further, ECU 118*a* may detect the mounting position based on the magnitude relation between the resistance value of S32 and the resistance value of S53. The process then proceeds to S4. In the second embodiment, after S5, the process does not proceed to S6 of the first embodiment, and proceeds to S7.

Note that other configurations and processes are the same as those in the first embodiment, and therefore, repeated description will not be given.

In the first and second embodiments described above, an example has been described in which one of the two battery packs 20 is selected as the battery pack 20 that executes the electrical leakage detection process, but the present disclosure is not limited to this. One of three or more battery packs 20 may be selected. In addition, a plurality of battery packs 20 (less than the total number of battery packs 20) among the three or more battery packs 20 may be selected.

In the first embodiment, the battery pack 20 that first starts communicating with ECU 18*a* is selected as the battery pack 20 that executes the electrical leakage detection process, but the present disclosure is not limited thereto. For example, the battery pack 20 that starts communicating with the ECU 18*a* last may be selected.

In the second embodiment, the battery pack 20 mounted at a predetermined position (a position corresponding to the terminal T12A) is detected based on the resistance between terminals (12/12A), but the present disclosure is not limited to this. For example, the position of each battery pack 20 may be detected based on a global positioning system (GPS) module mounted on each of the plurality of battery packs.

In the first and second embodiments, the electrical leakage detection function (12, 18*d*) is provided in the vehicle body 10 (10A), but the present disclosure is not limited to this. The electrical leakage detection function may not be provided in the vehicle body.

In the first and second embodiments described above, an example has been described in which the battery pack 20 that executes the electrical leakage detection process is selected based on predetermined information (communication start timing, mounting position) regarding the battery pack 20, but the present disclosure is not limited thereto. The battery pack 20 to execute the electrical leakage detection process may be randomly selected.

In the second embodiment, the battery mounting position corresponding to the terminal T12A and the battery mounting position corresponding to the terminal T12 are not described as having a particular difference, but the present disclosure is not limited thereto. For example, the battery mounting position corresponding to the terminal T12A may be a position where the temperature of the battery pack is more likely (or less likely) to increase than the battery mounting position corresponding to the terminal T12. In this case, it is possible to cause the battery pack with which the temperature tends to increase (or hardly increases) to execute the electrical leakage detection process.

In the first embodiment, communication between ECU of the mounted battery pack 20 and ECU of the vehicle body 10 is started in response to the battery pack 20 being mounted on the vehicle body 10. For example, the communication may be started in response to the ignition power being turned on after the plurality of battery packs 20 are mounted on the vehicle body 10.

In the first and second embodiments described above, ECU 18*a* (118*a*) directly communicates with each of the plurality of battery packs 20 (ECUs 28*a*, 28*b*). ECU 18*a* (118*a*) may communicate indirectly with a plurality of battery packs 20 (ECUs 28*a*, 28*b*), for example, through an overall ECU that governs the plurality of battery packs 20.

In the first and second embodiments, an example in which a command signal to execute the electrical leakage detection process is sent to the battery pack 20 has been described, but the present disclosure is not limited to this. For example, in a case where the electrical leakage detection process is automatically started in response to the start of communication in the battery pack, a command signal to execute the electrical leakage detection process may not be sent to the battery pack. In this case, a command signal not to execute the electrical leakage detection process needs to be sent to any one of the battery packs.

In the first (second) embodiment, an example has been described in which the battery pack 20 that first started communication (battery pack 20 disposed at a predetermined position) is caused to execute the electrical leakage detection process, but the present disclosure is not limited thereto. The selection criterion of the battery pack 20 to execute the electrical leakage detection process may not be limited to the above example. For example, the battery pack 20 having a lower state of health (SOH) may be caused to execute the electrical leakage detection process.

Figure 6:
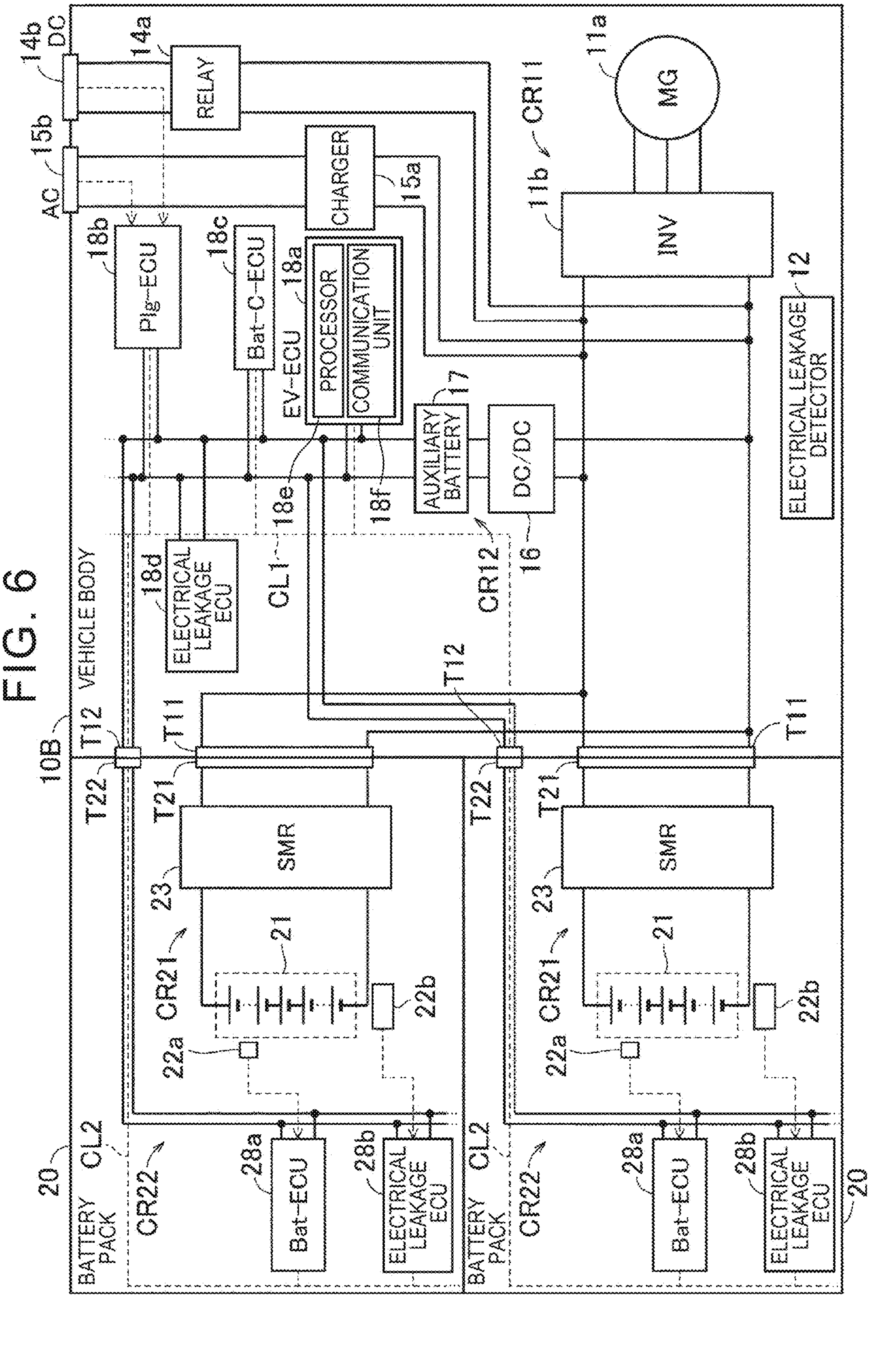
FIG. 6 is a diagram showing a configuration of an electrified vehicle according to a first modification of the first embodiment.
Figure 7:
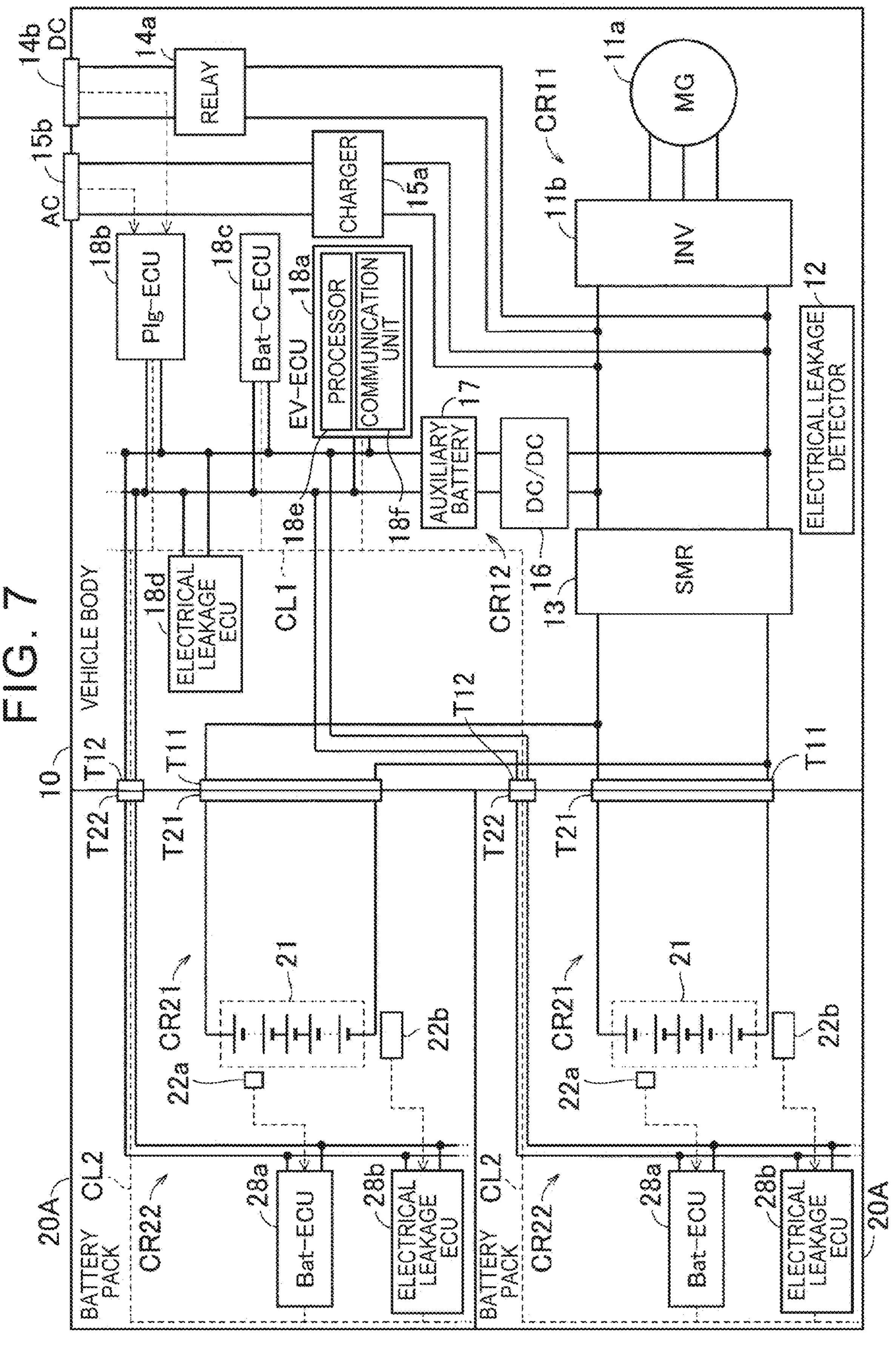
FIG. 7 is a diagram illustrating a configuration of an electrified vehicle according to a second modification of the first embodiment.

In the first and second embodiments, the vehicle body 10 (10A) and the battery pack 20 are each provided with the SMR (13, 23), but the present disclosure is not limited thereto. For example, as shown in FIG. 6, a vehicle body 10B without the SMR 13 may be used for electrified vehicle. As shown in FIG. 7, two battery packs 20A without the SMR 23 may be mounted on electrified vehicle. Note that FIG. 6 and FIG. 7 show modification examples based on the configuration of the first embodiment, but the modification examples may be adapted to the configuration of the second embodiment. Further, the battery pack 20A is an exemplary "battery" of the present disclosure.

The embodiment disclosed herein shall be construed as exemplary and not restrictive in all respects. The scope of the present disclosure is shown by the claims rather than by the above description of the embodiments, and is intended to include all modifications within the meaning and scope equivalent to those of the claims.

What is claimed is:

1. A control device for a vehicle equipped with a plurality of batteries each of which is replaceable and is configured to execute an electrical leakage detection process, the control device comprising:
- a first terminal to which a first battery of the plurality of batteries is connected;
- a second terminal to which a second battery of the plurality of batteries is connected; and
- a processor configured to sequentially acquire first battery information from the first battery and acquire second battery information from the second battery, wherein
  - the first terminal has a first resistivity and the second terminal has a second resistivity that is different from the first resistivity;

the processor determines a first resistance value between the first battery and the first terminal and determines a second resistance value between the second battery and the second terminal, the first battery information and the second battery information include the first resistance value and the second resistance value, respectively, and the processor then compares the first resistance value with the second resistance value, and executes the electrical leakage detection process on one of the first battery or the second battery based on a result of the comparison of the first resistance value with the second resistance value.

2. The control device according to claim 1, wherein the processor is further configured to select one of the first battery or the second battery that first starts communicating with a communication unit as the battery to execute the electrical leakage detection process.

3. The control device according to claim 1, wherein the selected battery of the first battery or the second battery on which the electrical leakage detection process executed is disposed at a predetermined position in the vehicle.

4. A vehicle, comprising:

a plurality of batteries; and the control device according to claim 1.

5. The control device according to claim 1, wherein the first resistivity is higher than the second resistivity.

6. The control device according to claim 1, wherein each of the first battery and the second battery further comprises a first voltage sensor and a second voltage sensor, respectively, each of the first voltage sensor and the second voltage sensor being configured to detect a voltage value between the first battery and the first terminal and the second battery and the second terminal, respectively, and the first battery calculates the first resistance value and the second battery calculates a second resistance value between the second battery and the second terminal based on detection results of the first voltage sensor and the second voltage sensor.

7. The control device according to claim 3, wherein the processor is further configured to identify the predetermined position in the vehicle based on the first resistance value and the second resistance value included in the first battery information and the second battery information, respectively.

* * * * *